Jan. 8, 1929.

E. V. BEALS 1,698,468

INTERNAL COMBUSTION ENGINE

Filed Aug. 13, 1921

Inventor
Erl V. Beals.
By Green and McCallister.
His Attorneys in fact.

E. V. BEALS

1,698,468

INTERNAL COMBUSTION ENGINE

Filed Aug. 13, 1921

Inventor
Erl V. Beals
By Green and McCallister
His Attorneys in fact.

Jan. 8, 1929.

E. V. BEALS

1,698,468

INTERNAL COMBUSTION ENGINE

Filed Aug. 13, 1921

E. V. BEALS

INTERNAL COMBUSTION ENGINE

Filed Aug. 13, 1921

Inventor
Erl V. Beals
By Green and McCallister
His Attorneys in fact

Jan. 8, 1929.

E. V. BEALS 1,698,468

INTERNAL COMBUSTION ENGINE

Filed Aug. 13, 1921

E. V. BEALS 1,698,468

INTERNAL COMBUSTION ENGINE

Filed Aug. 13, 1921      8 Sheets-Sheet 8

Inventor
Erl V. Beals.
By Green and McCallister
His Attorneys in fact.

Patented Jan. 8, 1929.

1,698,468

UNITED STATES PATENT OFFICE.

ERL V. BEALS, OF BOSTON, MASSACHUSETTS.

INTERNAL-COMBUSTION ENGINE.

Application filed August 13, 1921. Serial No. 492,035.

This invention relates to internal combustion engines and more particularly to those in which the fuel is injected into the charge of air after being compressed in the engine cylinder.

While engines operated upon the Diesel principle obtain the air in an incandescent state by compression, I have found that by omitting external cooling of the cylinders, I can obtain the temperatures necessary to carry on spontaneous ignition and combustion of relatively heavy fuel (such as fuel oil, distillates, kerosene, etc.) by relatively low compression, for instance, 150 pounds and by injecting the proper amounts of water into the engine cylinder during combustion therein, obtain an engine of high thermal efficiency and satisfactory operation.

An object of this invention is to provide a simple, relatively cheap internal combustion engine of high thermal efficiency and low fuel consumption.

Another object is to provide an internal combustion engine utilizing relatively heavy liquid fuels and in which spontaneous ignition is relied upon to ignite the combustion charges.

A still further object is to provide means for automatically injecting both fuel and water into the engine cylinder in proper amounts depending upon the load on the engine.

These, as well as other objects which will readily appear to those skilled in this particular art, I attain by means of the engine described in the specification and illustrated in the drawings accompanying and forming a part of this application.

In the drawings, Figs. 7 and 8 are side and top sectional views respectively of the water and oil injecting devices; Fig. 7 is taken on line 7—7 of Fig. 2 and Fig. 8 is an enlarged view of the parts shown at the top of Fig. 2.

Figure 19 is a diagrammatic view and illustrates a governor for operating lever 108. In case the engine embodying this invention is used for stationary purposes, and a constant speed is desired, this lever 108 could be connected up in this manner to a governor driven from the engine shaft.

Fig. 21 is a detail drawing.

While portions of this invention are applicable to either two or four cycle engines operating without external cooling, in attempting to provide a multi-cylinder engine of the simplest form and fewest parts, I have chosen a two cycle engine, and, while crank case compression may be used for scavenging and charging the cylinders, I prefer to utilize an independent means of air supply, such as a compressor which, if desired, may be coupled up so as to be an integral part of the organized engine.

In order to start the engine on heavy fuels such as fuel oil or distillate, I provide an incandescent wire such as is now common, the current to which may be turned off after the engine cylinders have attained the proper temperature for providing spontaneous ignition.

The cylinders are lagged in order to conserve the heat and independent fuel and water injecting devices are used, and these are simultaneously regulated so as to properly proportion the fuel and water in accordance with the demands on the engine without changing the predetermined or established ratio between fuel and water. The fuel injecting device operates by compression pressures and may be regulated so as to inject the fuel into the engine cylinder at any point in the compression strokes or at the end thereof, if it is so desired. The water injecting device is so regulated that a suitable quantity of water, say two and one-half times the volume of fuel is injected into the combustion space of the engine by pressure due to combustion as soon as a predetermined pressure has been obtained.

I find that by injecting a suitable amount of water during combustion, I can operate with cylinder temperatures such that automatic ignition will result.

In the drawings, I have shown a two cylinder engine having cylinders 20 of simple construction provided with inlet ports 21 and exhaust ports 22. The inlet ports by means of suitable connections 23 are coupled up to a compressor or other source of air supply (not shown). A supplemental air inlet 24 provided with an automatic valve 25 is utilized for each cylinder, although these supplemental inlets may be omitted if desired.

Each cylinder head is provided with an upwardly extending projection 26 which forms a housing for the fuel and water injecting devices. These devices in the main are identical but differ in minor details as will be seen hereinafter.

The projection 26 for each cylinder is provided with two axially aligned cylindrical chambers internally threaded from front to back as shown at 27 and 28. The two chambers are separated one from the other by a partition 29 provided with a central circular opening 30.

An annular gasket 31 is located on each side of partition 29 and a metal diaphragm 32 is confined in place against said gasket by means of retaining nut 33. Retaining nuts 33 are held in place by means of set screws 34. Caps 35 close the ends of the cylindrical chambers and form supports for portions of the fuel and water injecting mechanisms. Each of these caps at its center is bored to receive a stem 36 provided with a circular head 37 formed so as to lie against one of the diaphragms 32. Heads 37 lie within nuts 33 and when the diaphragms 32 are in their innermost positions, heads 32 contact with annular flanges 38 formed in said nuts for that purpose.

Each center hub 39 of cap 35 which forms a bearing for stem 36 is externally threaded to receive an adjustment nut 40 flanged at 41 and having gear teeth 42 cut therein. The teeth on one flange mesh with an adjustment pinion 43, the stem of which projects through cap 35 and is squared at 44 to receive a wrench while the teeth on the other flange mesh with a pinion 43$^a$ which projects through its cap and meshes with a rack 43$^b$ to be described hereinafter. A helical spring 45 surrounds each adjustment nut 40, and, lying between the flange of said nut and head 37, yieldingly holds said head in contact with annular flange 38 of nut 33 and therefore holds the diaphragm in its inner position.

An annular bushing 46 exteriorly threaded at 47 fits within an annular recess in cap 35 and this bushing is held in place by means of suitable screws 48 and is also doweled as shown at 49.

An internally threaded ring 50 is threaded so as to easily rotate on the threads of bushing 46 and is provided with gear teeth 51. End face 52 of ring 50 serves as an abutment face or stop for head 37 and limits the movement of diaphragm 32 away from partition 29.

The projection 26 of each cylinder head is flattened at the top and a combined valve chest and pump housing 53 is secured thereto by means of fillister head machine screws 54. The housing at its center is provided with a tapered hole to receive the tapered end 55 of a water conduit 55$^a$. The water conduit is threaded into a threaded hole in partition 29 and reduced at its inner end, projects through annular opening 30 and into a cylindrical channel 56, leading from the combustion space of the cylinder to the circular opening 30. Annular gaskets 31 space the diaphragms a distance away from partition 29, which separates the two cylindrical chambers of head projection 26 and this spacing of the diaphragms away from the partition 29 provides a passage for subjecting the diaphragms at all times to the pressures existing within the combustion space of the cylinders. A suitable clearance is maintained around the reduced end 57 of the water conduit so that the pressures in the cylinders will be communicated to the diaphragms. The combined valve chest and pump housing 53 is suitably drilled to provide pump barrels for water plunger 58 and fuel plunger 59. These plungers pass through stuffing boxes 60 and 61 and are forced on their injection strokes by the diaphragms through suitable intermediate mechanisms, each consisting of a lever 63 linked to the plunger by means of a link 62 and pivotally supported at 64 to cap 35. Lower arm 65 of the lever 63 is drilled to receive stem 66 of a contact piece 67 which slidingly bears against the outer end 68 of operating stem 36. A knurled nut 69, straddled by ears 70 formed on the upper arm of lever 63 is threaded to the upper end of stem 66 and by means of this knurled nut, the stem may be raised or lowered to vary the length of the lower lever arm and therefore the strokes of the pump plunger. A lock nut 71 secures the stem in adjusted position. Coil spring 72 holds contact piece 67 in contact with end 68 of stem 36.

The water pump which employs plunger 58 is provided with a spring loaded check valve 73 which projects downwardly into a valve chamber 74 drilled in valve chest 53. Water is forced into the barrel of plunger 58 under slight pressure through a check valve (not shown) within fitting 75 and plunger 58 on its inward strokes forces a certain fixed amount of such water through conduit 76 up past check valve 73 through horizontal conduit 77 to water conduit 57 and thence to the combustion space of the engine cylinder.

A pet cock 79 registers with water conduit 57 and may be used to relieve the pressures within the engine cylinder if desired.

Piping 80 connected to fitting 75 leads to a suitable source of water supply maintained under slight pressure.

A supply of relatively heavy liquid fuel maintained under slight pressure connects with the barrel of plunger 59 by means of suitable piping 81, and a check valve (not shown) within fitting 82 is interposed in the line between the fuel supply and the pump barrel. Plunger 59 on its inward strokes forces predetermined amounts of liquid fuel from the pump barrel through conduit 83 past check valve 84 and through piping 85 to a suitable nozzle 86 by way of nozzle stem 87, to the combustion space of the engine cylinder. A fine strainer (not shown) is provided in fitting 87 which connects piping 85 to the nozzle stem.

Check valves 73 and 84 are each provided with longitudinally extending grooves 89 which allow the valves to be seated even though oil is trapped in the pocket below the same; the oil, if trapped, moves up through the grooves to the outlets.

Fuel spray nozzles 86 may be of any desired construction so long as they break up the fuel into a fine mist.

Figure 4:
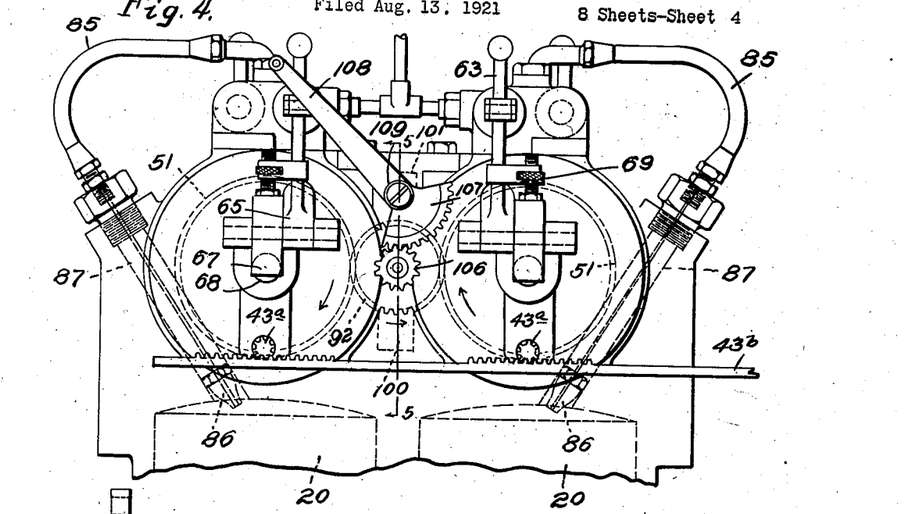
Fig. 4 is a fragmentary view in front elevation of the engine.

The rack 43$^b$ for operating pinions 43$^a$ is illustrated in Fig. 4 and if the engine is to be used on a motor vehicle, this rack will be connected up so as to be operated by the driver of the vehicle. This allows him to vary the time of injection of the fuel relative to the position of the piston in a manner corresponding to the manipulation of the spark on standard engines.

Figure 1:
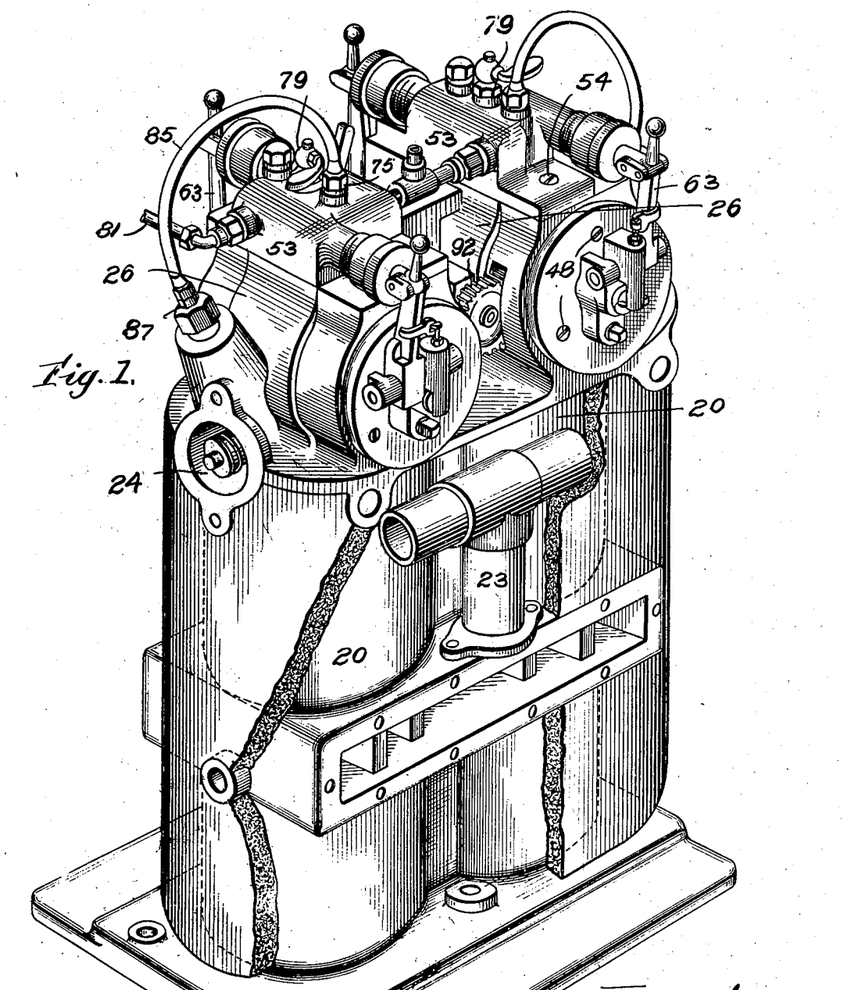
Fig. 1 is a view in perspective of a two cylinder two cycle engine embodying this invention.
Figure 2:
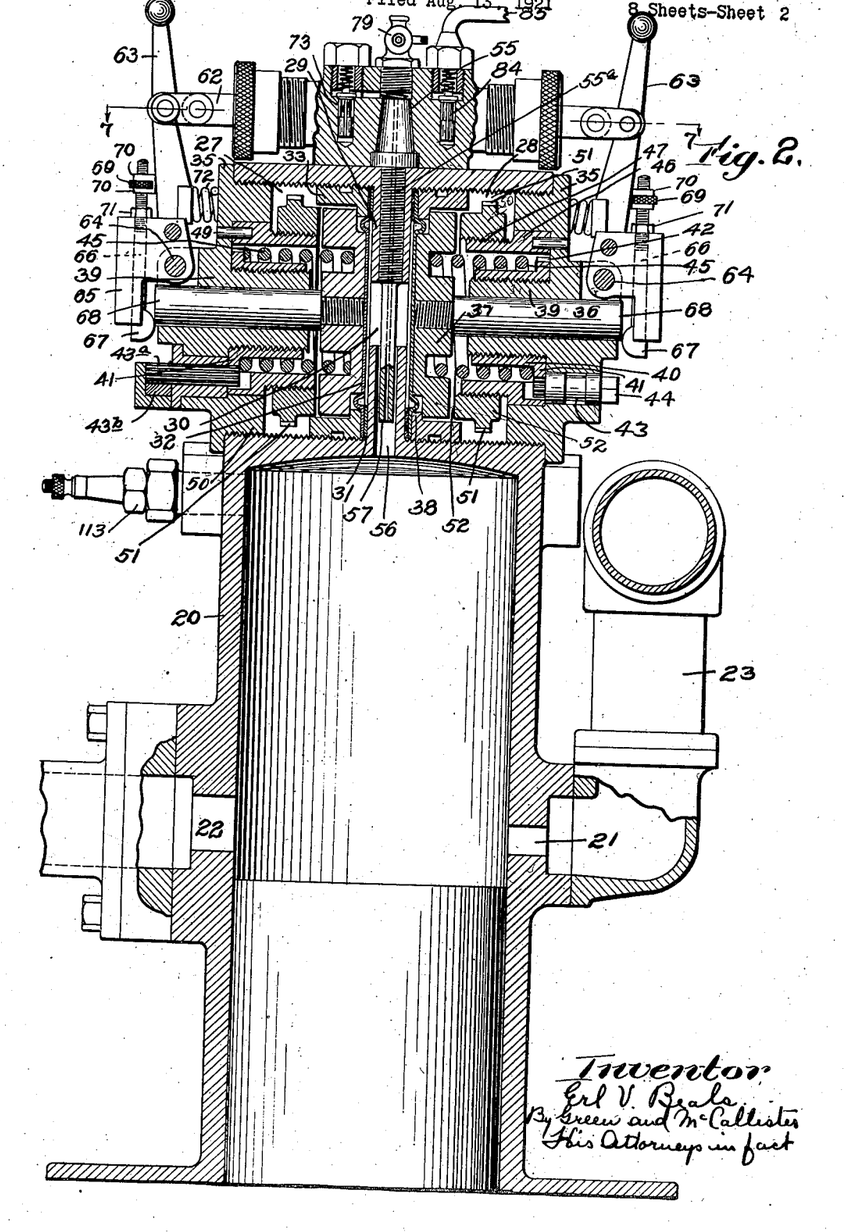
Fig. 2 is a view in vertical section taken through one of the cylinders of the engine shown in Fig. 1.
Figure 3:
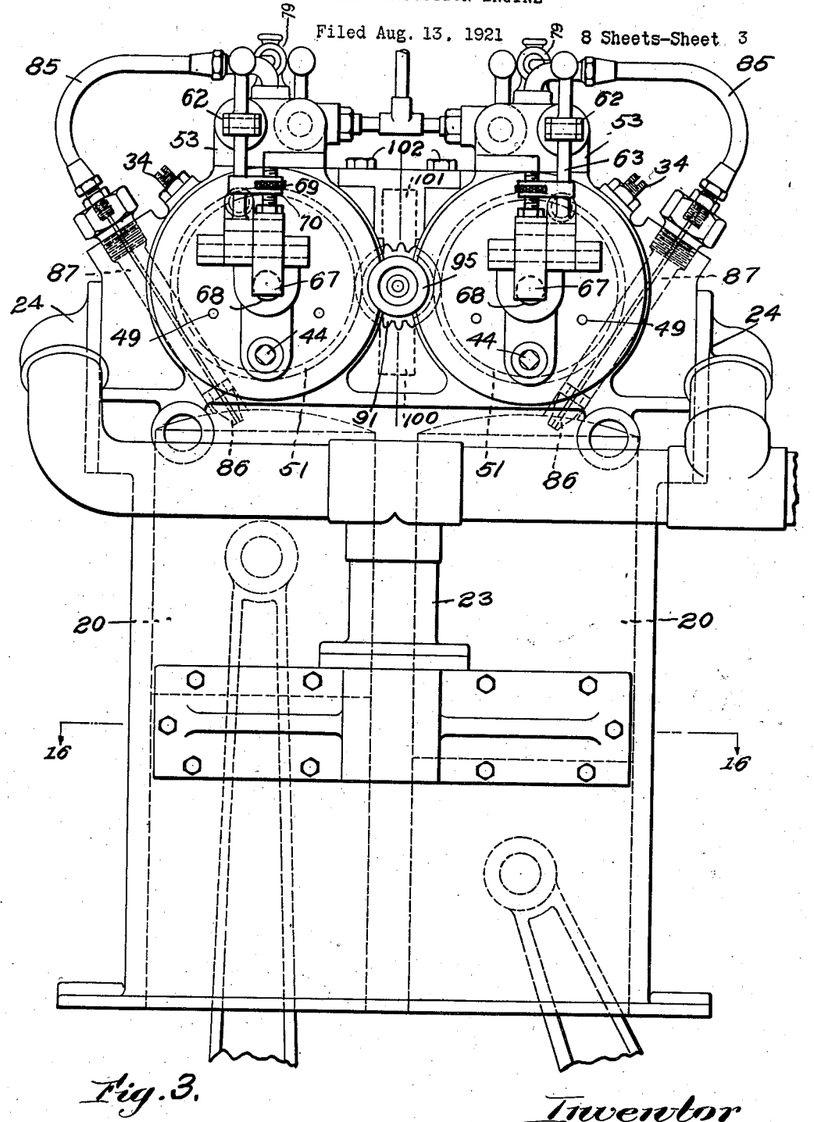
Fig. 3 is a view in back elevation of the engine.

Gear teeth 51 on stop rings 50 mesh with gears carried on shaft or spindle 90. Gear teeth 51 for the water injection devices for both cylinders mesh with gear 91, which is loose on shaft 90. Gear teeth 51 for the fuel injection devices of both cylinders mesh with gear 92 which is keyed to shaft 90. Gear 91 is provided with clutch jaws on one face thereof and is adapted to be locked to the shaft by means of a clutch device 93 the jaws of which are held in interlocked position with the gear jaws by means of a spring 94 which bears against a hand wheel 95 the hub 96 of which is feathered to shaft 90. Shaft 90 is mounted for rotation within a support 97 arranged to float between two coil springs 98 and 99. The lower spring 98 is located in a cylindrical cavity shown by dotted lines at 100 Figs. 3 and 4, while upper spring 99 is located within a cylindrical cavity shown by dotted lines at 101 in Figs. 3 and 4. The portion holding spring 99 is bolted to the projection 26 by means of bolts 102. The cylindrical walls of the diaphragm housings are cut away to allow gears 91 and 92 to project into the housings in order to mesh with gear teeth 51.

Figures 5, 6:
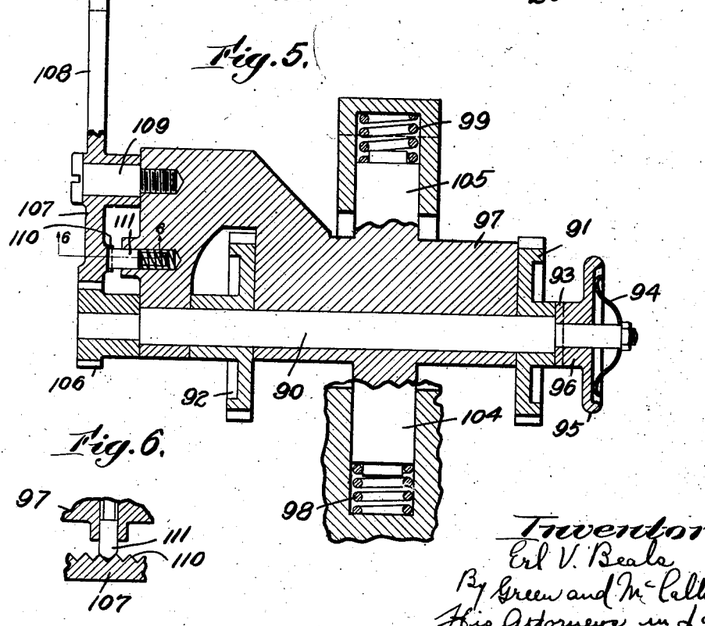
Figs. 5 and 6 are detail sectional views of the controlling mechanism and are taken on lines 5—5 and 6—6 respectively of Figs. 4 and 6, respectively.
Figure 7:
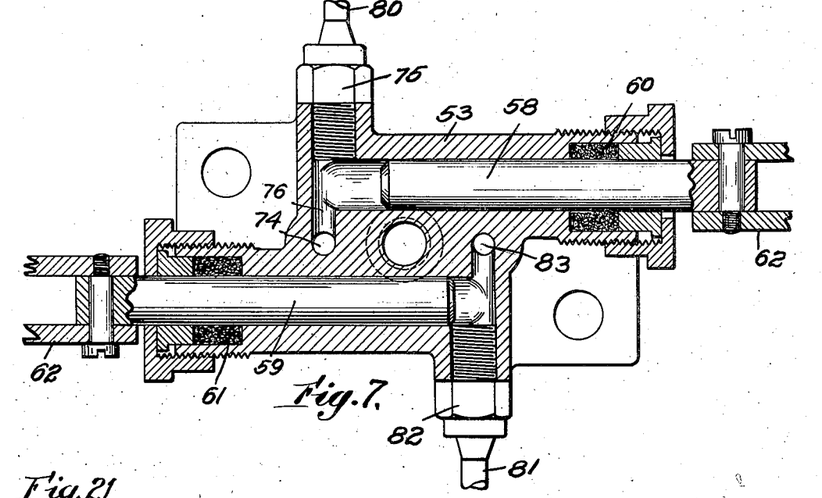
Figures 8, 21:
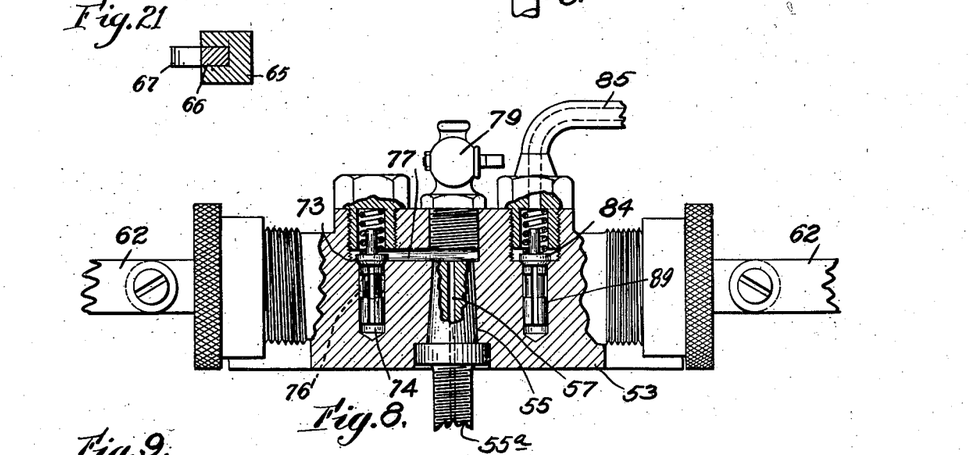
Figures 9, 10:
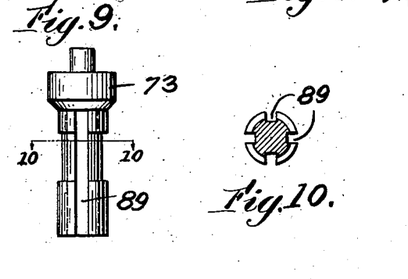
Figs. 9 and 10 are detail views of one of the valves used in the water and oil injecting devices, Fig. 10 being a sectional view taken on line 10—10 of Fig. 9.
Figures 11, 12:
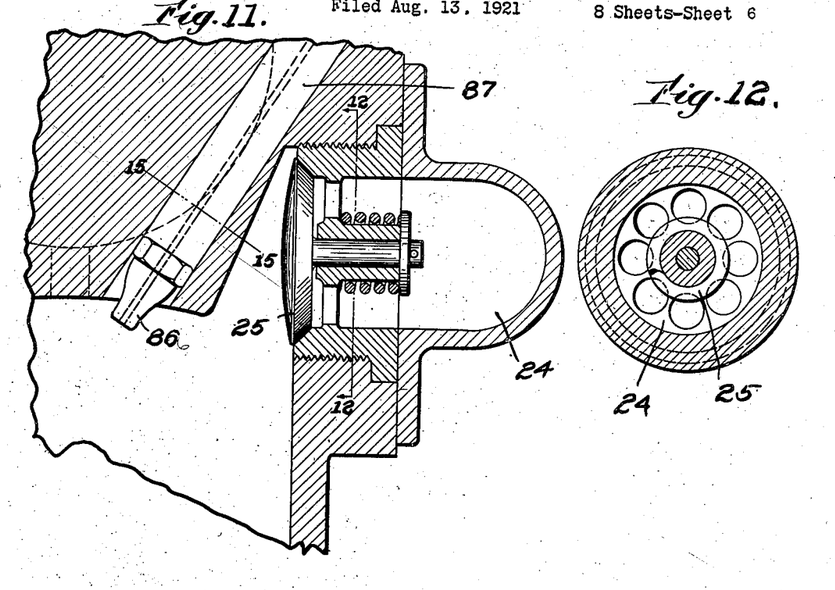
Fig. 11 is an enlarged fragmentary view in section and illustrates a portion of the fuel injecting nozzle and supplementary air inlet.
Fig. 12 is a sectional view taken on line 12—12 of Fig. 11.
Figures 13, 15:
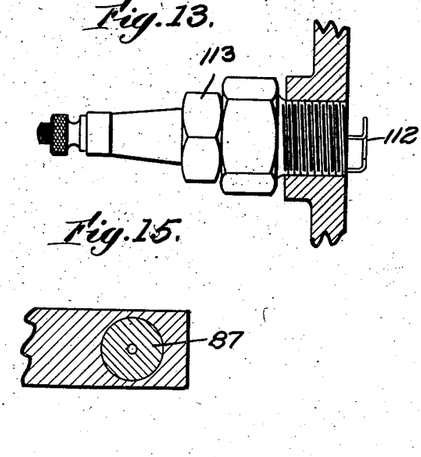
Figs. 13 and 14 are detail views of the hot wire ignition device utilized in starting.
Fig. 15 is a sectional view taken on line 15—15 of Fig. 11.
Figure 14:
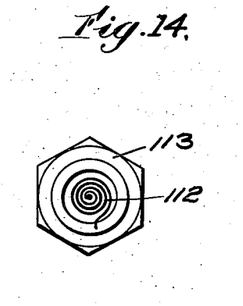
Figure 16:
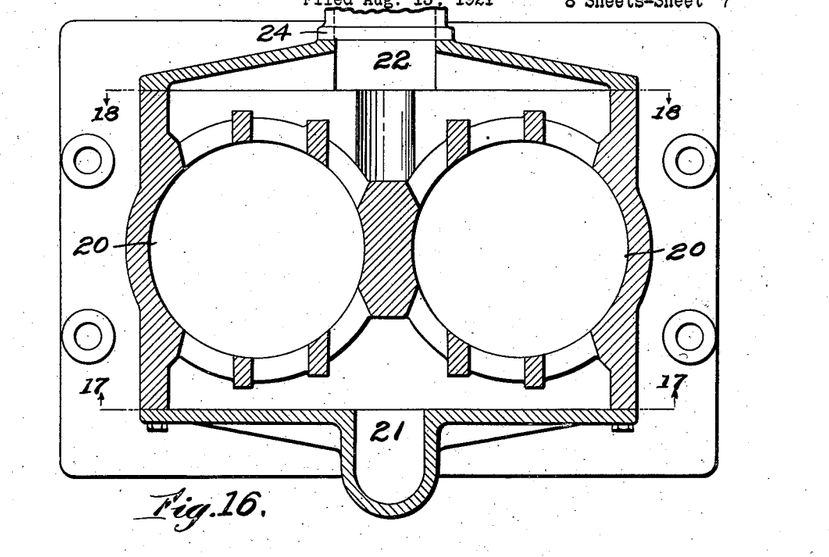
Fig. 16 is a sectional plan view illustrating the main inlet and exhaust ports.
Figure 17:
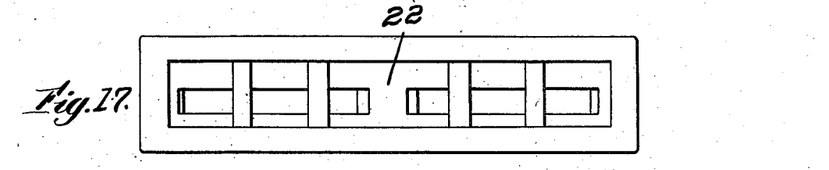
Figs. 17 and 18 are detail views of the inlet and exhaust manifolds and are taken on lines 17—17 and 18—18 respectively of Fig. 16.
Figure 18:
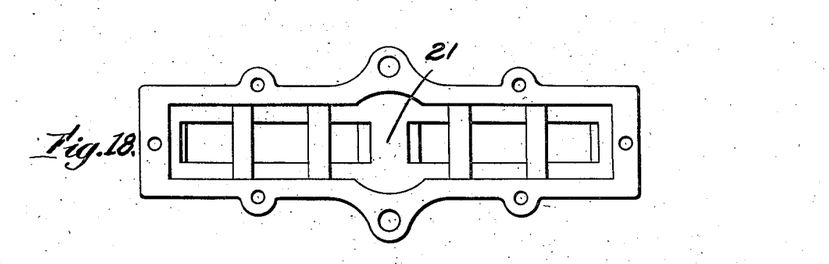
Figure 19:
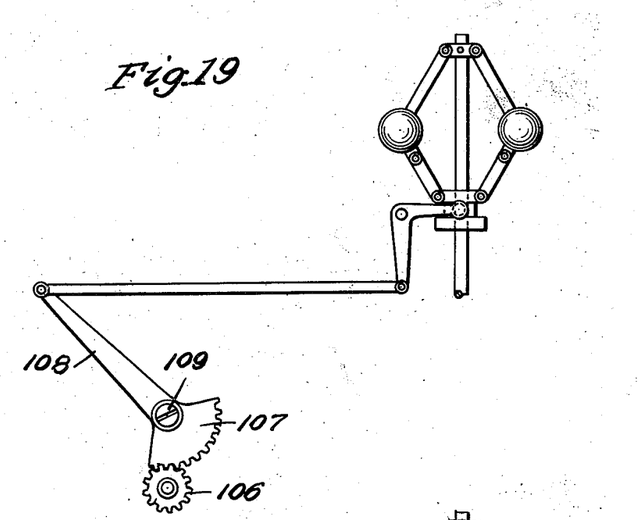
Figure 20:
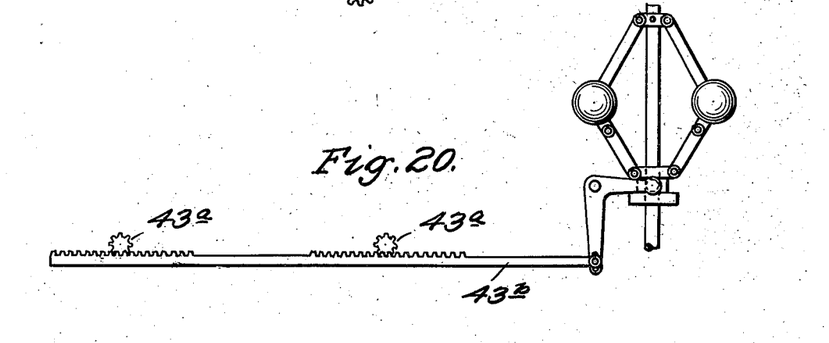
Fig. 20 is a diagrammatic view of a governor coupled up to rack $43^b$. If it is desired for automotive work to have the rack $43^b$ automatically shifted, a speed governor connected up to the engine shaft may be utilized.

Support member 97 is provided with a lower cylindrical stem 104 and an upper cylindrical stem 105 and these stems bear against the inner ends of springs 98 and 99 which tend to hold the support member in proper position, so that the set of gears will be maintained in proper alignment and mesh. By means of this, all four gears having teeth 51 are maintained in proper and fixed relation to one another. One end of shaft 90 has a pinion 106 pinned to it and this pinion meshes with a gear sector 107 formed on the lower end of an operating lever 108 pivoted at 109 to support member 97. The back of this sector at 110 is serrated as shown in Fig. 6 and this lever is held in adjusted position by means of a spring pressed pin 111 which engages said serrations.

All parts except the cylinders and pistons that are subjected to the products of combustion and water vapors such as the diaphragms, water nozzles, fuel nozzles, pump plungers and the pump valves are preferably made from a non-corrosive metal such as nickel or Monel metal.

*Operation.*

The fuel injection mechanism will be so adjusted as to deliver the proper amounts of fuel into the cylinders prior to the time compression has been completed. The point of fuel injection may be varied as desired by moving rack 43$^b$, thereby changing the tension of the spring which resists movement of the fuel diaphragm. As the spring is weakened, the fuel injection will occur earlier in the stroke and as it is increased, the fuel injection will occur later. It must be seen that the tension of the spring is not great enough to prevent fuel injection by the time maximum compression pressure has been attained.

The tension of the spring of the water injecting device will be adjusted so that no water will be injected until after the maximum compression pressure has been attained. The water is injected during combustion and spring 45 of the water injecting device, by means of pinion 43 will be adjusted and fixed so that water will be injected into the combustion space immediately after combustion is started.

If the engine is used on an automotive device, lever 108 will be connected up so as to be under the control of the operator and by moving this lever, the amount of fuel and water injected may be simultaneosly varied (without varying the ratio between fuel and water) in order to care for the demands upon the engine. This lever will be operated as the ordinary throttle lever is now operated to control the speed of the engine. The ratio of water to fuel may be adjusted by means of adjustment nuts 69 by means of which the length of strokes of the fuel and water plungers may be varied.

The engine of this invention is designed primarily as a high speed engine and since the cylinders are not externally cooled but are internally cooled by the injected water, the fuel may be injected at a much earlier period than in engines of the "Diesel" type, not only making a more flexible engine than engines of the "Diesel" type, but an engine that may be run at a higher speed.

I find that on automotive devices, it is sometimes desirable to connect rack 43$^b$ to a fly ball or centrifugal governor driven from the engine shaft so as to vary the time of fuel injection according to changes in the speed of the engine. This corresponds to advancing and retarding the spark in the ordinary internal combustion engines.

The water injected into the combustion space during combustion tends to retard combustion and I am, therefore, enabled to inject the fuel at a much earlier time than is possible with engines of the "Diesel" type. I find that it is possible to obtain satisfactory results even when the fuel is injected 90° early.

In starting with a cold engine and utilizing heavy, not readily inflammable liquid fuel, I find it advisable to maintain the wire 112 of plug 113 incandescent, so as to ignite the charge of fuel and air. The current to this plug, however, may be turned off as soon as the cylinder walls have attained a temperature which, together with the heat of compression, will ignite the charge. After such temperature has been attained, ignition will occur automatically and spontaneously. The lagging of the cylinder conserves heat so that the self ignition takes place shortly after starting.

Since the engine which I have chosen to illustrate this invention is a two cylinder two cycle engine, one of the cylinders will always be under compression and its rings 50, therefore, prevented from freely rotating on the threads 47. If shaft 90 were mounted in rigid bearings, lever 108 could never be moved, but by floating the support 97 for shaft 90 between springs 98 and 99, gears 91 and 92 will roll up or down teeth 51 as the case may be, depending upon which cylinder is under pressure. While both cylinders are under sufficient pressure to lock the rings 50, lever 108 cannot be moved, but as soon as one cylinder is relieved of pressure at the beginning of the exhaust period thereof, gears 91 and 92 by means of lever 108 will be caused to roll up or down in teeth 51 of the locked rings 50 (which will then act as a rack) and will carry with them any unlocked gears. When the rings 50, which have been moved, are locked, the relieved rings will then be moved and the vertical movement of support 97 will then be in the opposite direction. The combined result of the operation of moving lever 108 will be alternate rotation in the same direction of the rings 50 for the two cylinders.

Having thus described my invention, what I claim and desire to secure by Letters Patent is:—

1. The method which consists in operating an internal combustion engine at such temperatures as to produce spontaneous ignition in each cycle before the piston has completed its compression stroke and in injecting fuel into the engine cylinder prior to, during the time of and immediately after spontaneous ignition and then in injecting water into the cylinder during combustion.

2. The combination with an engine cylinder not externally cooled, of independent means constructed to be operated solely by the pressures within said cylinder for successively injecting fuel and water.

3. The combination with an engine cylinder not externally cooled, of independent means operating solely by the pressures within said cylinder for successively injecting fuel and water and means whereby the time of fuel injection may be varied.

4. In an internal combustion engine, fuel and water pumps for forcing fuel and water into the engine cylinder and independent devices employing diaphragms subjected to the pressures within said cylinder for operating said pumps.

5. In an internal combustion engine, means for injecting fuel into the engine cylinder, means for later injecting water into the engine cylinder and means adapted to be operated simultaneously to vary the amounts of fuel and water injected without varying the ratio of one to the other.

6. In an internal combustion engine, independent fuel and water injecting devices, means for controlling the operation of said devices so that the water is injected after the fuel injection and means for varying the amounts of water and fuel injected without varying the ratios therebetween.

7. In an internal combustion engine, a pump for forcing water into the engine cylinder, a diaphragm subject on one side to the pressures within the engine cylinder, a spring resisting the movements of said diaphragm due to cylinder pressure, an adjustable stop for limiting the movements of said diaphragm in one direction and means between said diaphragm and said pump for operating said pump.

8. In an internal combustion engine, water and fuel injecting devices operated by the pressures within the engine cylinder, means for preventing injection of water until after flame propagation has begun, means for varying the time of fuel injection and means for simultaneously varying the amounts of fuel and water injected without varying the ratios between the same.

9. In an internal combustion engine, means operated by the pressures within the engine cylinder for successively injecting fuel and water, means for simultaneously varying the amounts of fuel and water injected without varying the ratios therebetween and means for at will varying the time of fuel injection.

10. In an internal combustion engine, compression pressure operated means for injecting fuel during each compression stroke, means operated by the pressure due to combustion for injecting water, means for simultaneously varying the amounts of fuel and water injected without varying the ratios therebetween and means for varying the time of fuel injection.

11. In an internal combustion engine, independent fuel and water injecting devices each including a diaphragm subject to the pressures within the engine cylinder, springs resisting the movements of said diaphragms, stops for positively limiting the movements of said diaphragms, and means for simultaneously adjusting the position of said stops constructed and arranged so as to vary the amounts of fuel and water injected without varying the ratios therebetween.

12. In an internal combustion engine, a cylinder, adjustable means for injecting a predetermined amount of fuel into the engine cylinder, adjustable means for subsequently injecting a predetermined amount of water into the engine cylinder, means for varying the amounts injected without affecting the ratio and means for varying said ratio.

In testimony whereof, I have hereunto subscribed my name this 30th day of July, 1921.

ERL V. BEALS.